US008790754B1

(12) United States Patent
Rangan et al.

(10) Patent No.: US 8,790,754 B1
(45) Date of Patent: Jul. 29, 2014

(54) METHOD OF PREPARING METAL NITRIDE AND/OR METAL OXYNITRIDE PARTICULATE MATERIAL AS NANOPARTICLES, MICROPARTICLES, NANOTUBES, BULK POWDER, AND/OR COATINGS FROM ORGANOMETALLIC PRECURSORS, AND PRECURSORS THEREFOR

(75) Inventors: Krishnaswamy Kasthuri Rangan, Fairfax, VA (US); Cheryl Renee Verdecchio, Tabernacle, NJ (US); Ramachandran Radhakrishnan, Fairfax, VA (US); Tirumalai Srinivas Sudarshan, Vienna, VA (US)

(73) Assignee: Materials Modification, Inc., Fairfax, VA (US)

(*) Notice: Subject to any disclaimer, the term of this patent is extended or adjusted under 35 U.S.C. 154(b) by 1185 days.

(21) Appl. No.: 12/320,804

(22) Filed: Feb. 5, 2009

Related U.S. Application Data

(60) Provisional application No. 61/026,278, filed on Feb. 5, 2008.

(51) Int. Cl.
*B05D 1/36* (2006.01)
(52) U.S. Cl.
USPC .................................................. 427/419.7
(58) Field of Classification Search
USPC .................. 423/406, 409, 411, 412
See application file for complete search history.

(56) References Cited

U.S. PATENT DOCUMENTS

| 4,528,119 A * | 7/1985 | Barnes .................. 252/503 |
| 2001/0005612 A1 | 6/2001 | Lee et al. |
| 2005/0191492 A1* | 9/2005 | Yadav .................. 428/407 |
| 2008/0131350 A1* | 6/2008 | Burkes et al. ........ 423/409 |

FOREIGN PATENT DOCUMENTS

JP 2002-154823 A * 5/2002

OTHER PUBLICATIONS

JP 2002-154823 A translation, Suzuki et al., May 2002.*
Buha et al., "Thermal Transformation of Metal Oxide Nanoparticles into Nanocrystalline Metal Nitrides Using Cyanamide and Urea as Nitrogen Source," 2007, Chem. Mater., 19, pp. 3499-3505.*
R. Sanjines, M. Benkahoul, M. Papagno, F. Levy, D. Music. Electronic structure of $Nb_2N$ and NbN thin films. J. Appl. Phys. 2006, 99, 044911 (5 pages).
Gmelins Handbuch der anorganischen Chemie, Niob, Teil B1, vol. 8 (Eds.: R. J. Meyer), Verlag Chemie, Weinheim, 1970, 91-127.
G. M. Demyashev, V. R. Tregulov, R. K. Chuzhko. Crystallization and Structure of $\beta$—$Nb_2N$ and $\gamma$—$Ta_2N$ Heteroepitaxial Films. J. Cryst. Growth 1983, 63, pp. 135-144.

(Continued)

*Primary Examiner* — Melvin C Mayes
*Assistant Examiner* — Stefanie Cohen
(74) *Attorney, Agent, or Firm* — Dinesh Agarwal, P.C.

(57) ABSTRACT

A method of preparing a metal nitride and/or metal oxynitride particulate material includes heating a stoichiometric mixture of a metal compound and urea at a temperature of about 400-1000° C. for a predetermined time period in the presence of argon, nitrogen, or both. The particulate material produced includes nanoparticles, nanotubes, microparticles, powder, or a combination thereof.

1 Claim, 9 Drawing Sheets

(56) References Cited

OTHER PUBLICATIONS

G. M. Demyashev, V. R. Tregulov, A. A. Gavrich. Structure of β—$Nb_2N$ and γ—$Ta_2N$ Heteroepitaxial Layers Grown on Multi-Oriented Films on Nb and Ta Deposited on Copper Substrates. *J. Cryst. Growth* 1988, 87, pp. 33-40.

G.-I. Oya, Y. Onodera. Transition temperatures and crystal structures of single-crystal and polycrystalline NbN films. *J. Appl. Phys.* 1974, vol. 45, No. 3, 1389-1397.

A. Ishikawa, T. Takata, J. N. Kondo, M. Hara, K. Domen. Electrochemical Behavior of Thin $Ta_3N_5$ Semiconductor Film. *J. Phys. Chem. B* 2004, 108, 11049-11053.

H.-J. Cho, D.-G. Park, I.-S. Yeo, J.-S. Roh, S. W. Park. Characteristics of $TaO_xN_y$ Gate Dielectric with Improved Thermal Stability. *Jpn. J. Appl. Phys.* 2001, vol. 40, pp. 2814-2818.

H.-T. Chiu, C.-N. Wang, S.-H. Chuang. Communications Metal-Organic CVD of Tantalum Oxide from tert-Butylimidotris (diethylamido) tantalum and Oxygen. *Chem. Vap. Deposition* 2000, 6, No. 5, pp. 223-225.

C.-A. Jong, T. S. Chin. Optical characteristics of sputtered tantalum oxynitride Ta(N, O) films. *Mat. Chem. Phys.* 2002, 74, pp. 201-209.

X.Z. Chen, J.L. Dye, H.A. Eick, S.H. Elder, K.-L. Tsai. Synthesis of Transition-Metal Nitrides from Nanoscale Metal Particles Prepared by Homogeneous Reduction of Metal Halides with an Alkalide. *Chem. Mater.* 9, 1172-1176 (1997).

X. Feng, Y.-J. Bai, B. Lo, C.G. Wang, Y.-X. Qi, Y.-X. Liu, G.-L. Geng, Low Temperature Induced Synthesis of TiN Nanocrystals, *Inorg. Chem.* 43, pp. 3558-3560 (2004).

C.J. Carmalt, A.H. Cowley, R.D. Culp, R.A. Jones, Y.-M. Sun, B. Fitts, S. Whaley, H.W. Roesky. Monomeric Titanium(IV) Azides as a New Rout to Titanium Nitride. *Inorg. Chem.* 36, pp. 3108-3112 (1997).

P. Cai, Z. Yang, C. Wang, P. Xia, Y. Qian. Synthesis of nanocrystalline VN via thermal liquid—solid reaction. *Materials Letters* 60, pp. 410-413 (2006).

R.A. Janes, M. Aldissi, R.B. Kaner. Controlling Surace Area of Titanium Nitride Using Metathesis Reactions. Chem. Mater., 15, pp. 4431-4435 (2003).

A. Gomathi, C.N.R. Rao. Nanostructures of the binary nitrides, BN, TiN, and NbN, prepared by the urea-route. Materials Research Bulletin, 41, pp. 941-947 (2006).

L.E. Toth. Transition Metal Carbides and Nitrides, Academic Press, New York, 1971.

P.K. Tripathy, J.C. Sehra, A.V. Kulkarni. On the carbonitrothermic reduction of vanadium pentoxide. J. Mater. Chem. 11, pp. 691-695(2001)

I.P. Parkin. Solid State Metathesis Reaction for Metal Borides, Silicides, Pnictides and Chalcogenides: Ionic or Elemental Pathways. Chem. Soc. Rev., 25, 199-207 (1996).

L. Chen, Y. Gu, L. Shi, Z. Yang, J. Ma, Y. Qian. A room-temperature synthesis of nanocrystalline vanadium nitride. Solid State Communications, 132, pp. 343-346 (2004).

R. Fix, R.G. Gordon, D.M. Hoffman. Chemical Vapor Deposition of Vanadium, Niobium, and Tantalum Nirtide Thin Films. Chem. Mater., 5, pp. 614-619 (1993).

A. Newport, C.J. Carmalt, I.P. Parkin, S.A. O'Neill. The dual source APCVD of titanium nitride thin films from reaction of hexamethyldisilazane and titanium tetrachloride. J. Mater. Chem. 12 pp. 1906-1909, (2002).

Qinghong Zhang and Lian Gao. $Ta_3N_5$ Nanoparticles with Enhanced Photocatalytic Efficiency under Visible Light Irradiation. Langmuir, 20, pp. 9821-9827 (2004).

JCPDS Card No. 38-1155, Joint Committee on Powder Diffraction Standards Data Base, International Center for Diffraction Data, Swarthmore, PA, 1992 (1 page).

* cited by examiner

METHOD OF PREPARING METAL NITRIDE AND/OR METAL OXYNITRIDE PARTICULATE MATERIAL AS NANOPARTICLES, MICROPARTICLES, NANOTUBES, BULK POWDER, AND/OR COATINGS FROM ORGANOMETALLIC PRECURSORS, AND PRECURSORS THEREFOR

CROSS-REFERENCE TO RELATED APPLICATIONS

The present application claims the benefit of prior U.S. Provisional Application Ser. No. 61/026,278, filed Feb. 5, 2008, which is hereby incorporated herein in its entirety by reference.

FIELD AND BACKGROUND OF THE INVENTION

The present invention is directed to preparing metal nitride and/or metal oxynitride particulate material, such as nanoparticles, microparticles, nanotubes, bulk powder, and to form coatings from organometallic precursors. Additionally, the invention is directed to making organometallic precursors that can be used to prepare metal nitride and/or metal oxynitride particulate material.

Refractory nitrides are useful materials with numerous industrial applications. For example, niobium nitride (NbN) is a hard, metallic refractory, which is silver in color [Ref. 1] and has superconducting properties (Tc=17.3 K) [Ref. 2]. Tantalum nitrides have more widespread commercial usage than niobium nitride. The two most common forms of tantalum nitride are tantalum(V) nitride ($Ta_3N_5$) and tantalum(III) nitride (TaN). TaN is a hard refractory, metallic material, which is silver in color. It has good shock and heat resistance leading to its use in corrosion and wear resistant coatings. TaN thin films are suitable for use as diffusion barriers in integrated circuits. Tantalum nitride exists in a large variety of stable and metastable phases. There are three known thermodynamically stable phases, namely $\gamma$-$Ta_2N$, $Ta_5N_6$, and $Ta_3N_5$. The electrical properties of these phases varies from nitrogen deficient $\gamma$-$Ta_2N$ to nitrogen rich $Ta_3N_5$, from metallic $\gamma$-$Ta_2N$, $\in$-TaN, $\delta$-TaN, and $Ta_5N_6$ to completely insulating $Ta_3N_5$. Although most of the applications involve conducting-TaNx-materials, two applications of the insulator, $Ta_3N_5$, can be considered. First, it can be used as a visible-light driven photoelectrode material for the conversion of photon energy into chemical energy (e.g., the splitting of water). The band positions (conducting band, valence band) of $Ta_3N_5$, enable this material to act as a photocatalyst [Ref. 3]. A second application is the use of $Ta_3N_5$ as a gate dielectric in the fabrication of MOSFET transistor-structures [Ref. 4]. Based on the mechanical properties, these materials are applied in the formation of thin coatings on tools in order to improve their wear resistance.

Stable phases of vanadium nitride are VN and $V_2N$. VN crystallizes in the NaCl (Fm3m) structure and $V_2N$ crystallizes in the hexagonal structure ($C_62$). VN has been tested for application in super capacitors. VN coatings are used in mechanical tools. VN powders show some exceptional catalytic properties due to a vanadium oxide coating formed on the surface. VN is a super conductor with transition temperature of 8.2K.

Among the above-noted metal nitride compositions, only $Ta_3N_5$ possesses the required band gap for absorption of light, and effectively acts as a photocatalyst in splitting water. Solid solutions between Ta, Nb, and V nitrides may produce new materials with superior photocatalytic properties.

Various methods have been reported for the synthesis of nanocrystalline metal nitrides in the prior art. Most common methods of metal nitride synthesis involve high temperature reactions between the metal oxide or metal chloride under a constant flow ammonia gas [Ref. 5]. The synthesis of single-crystalline metal nitrides using the metathesis reactions between metal chlorides and $NaN_3$ or $NaNH_2$ have been reported recently [Ref. 6]. The metathesis reaction involving $TiCl_4$ and $Ca_3N_2$ also produces TiN nanorods [Ref. 7]. A self-propagating combustion synthesis of NbN has also been reported. Gomathy and Rao teach the use of synthesis of NbN, BN and TiN by reacting urea with a corresponding metal compound [Ref. 8]. Conventionally, VN has been synthesized by various high temperature methods, such as the direct reaction of metal vanadium with nitrogen at 1200° C. [Ref. 9], carbothermal reduction of vanadium pentoxide in $N_2$ at about 1500° C. [Ref. 10], and solid-state metathesis (SSM) routes at elevated temperatures [Ref. 11]. However, most of these reactions involve processing temperatures higher than 1000° C. for extended time periods. Qian et al. recently reported a facile approach to prepare VN at room temperature, using vanadium tetrachloride ($VCl_4$) as the vanadium source and sodium amide ($NaNH_2$) as the nitrogen source [Ref. 12].

Metal nitride films have been generally deposited using chemical vapor deposition (CVD) involving the reaction of metal chloride with ammonia in the presence of hydrogen at temperatures above 900° C. This reaction releases corrosive hydrochloric acid vapor, which along with the high deposition temperatures, makes the process largely unsuitable for microelectronic applications. Deposition of NbN films from $Nb(NMe_2)_4/NH_3$ has been reported at temperatures from 200 to 450° C. [Ref. 13]. This reaction does, however, produce organic contaminants. Niobium nitride thin films have also been prepared by sputtering niobium metal in a nitrogen atmosphere. TiN by CVD of $TiCl_4$ and hexamethylenedisilazane (HMDS) [Ref. 14].

ASPECTS OF THE INVENTION

The present disclosure is directed to various aspects of the present invention.

One aspect of the present invention is to prepare a metal nitride and/or metal oxynitride particulate material.

Another aspect of the present invention is to prepare a metal nitride and/or metal oxynitride particulate material by a method which is simple and uses inexpensive and safer starting materials.

Another aspect of the present invention is to prepare metal nitride and/or metal oxynitride microparticles.

Another aspect of the present invention is to prepare metal nitride and/or metal oxynitride nanoparticles.

Another aspect of the present invention is to prepare metal nitride and/or metal oxynitride nanotubes.

Another aspect of the present invention is to prepare metal nitride and/or metal oxynitride bulk powder.

Another aspect of the present invention is to prepare an organometallic precursor suitable for making a metal nitride and/or metal oxynitride particulate material, nanoparticles, nanotubes, and/or bulk powder.

Another aspect of the present invention is to coat a substrate with a metal nitride and/or metal oxynitride coating or thin film.

Another aspect of the present invention is to provide a method of preparing a metal nitride and/or metal oxynitride particulate material, which includes heating a stoichiometric mixture of a metal compound and urea at a temperature of about 600-1000° C. for a predetermined time period in the presence of argon.

Another aspect of the present invention is to provide a method of preparing an organometallic precursor suitable for making a metal nitride and/or metal oxynitride particulate material, which includes heating a stoichiometric mixture of a metal compound and urea at a temperature of about 30-300° C. for a predetermined time period in the presence of nitrogen, argon, or both.

Another aspect of the present invention is to provide a method of preparing a metal nitride or metal oxynitride particulate material, which includes providing a suitable amount of an organometallic precursor prepared from a stoichiometric mixture of a metal compound and urea, and heating the organometallic precursor at a temperature of about 600-1000° C. for a predetermined time period in the presence of nitrogen, argon, or both.

Another aspect of the present invention is to provide a method of providing a substrate with a metal nitride or metal oxynitride coating, which includes providing a suitable amount of an organometallic precursor prepared from a stoichiometric mixture of a metal compound and urea, forming a solution of the organometallic precursor using a solvent, coating the substrate with the solution, and heating the coated substrate to 400-1000° C. in the presence of nitrogen, argon or both.

Another aspect of the present invention is to provide a method of preparing a nitrogen-doped titanium dioxide particulate material, which includes heating a stoichiometric mixture of a titanium dioxide powder and urea at a temperature of about 300° C. for a predetermined time period in the presence of nitrogen.

BRIEF DESCRIPTION OF THE DRAWINGS

One of the above and other aspects, novel features and advantages of the present invention will become apparent from the following detailed description of the non-limiting preferred embodiment(s) of invention, illustrated in the accompanying drawings, wherein.

DETAILED DESCRIPTION OF THE PREFERRED EMBODIMENT(S) OF THE INVENTION

The embodiments of the present invention illustrate methods for the synthesis of nanocrystalline metal nitrides $M_xN_y$ (x=1 to 4 and y=1 to 5) and metal oxynitrides $M_xO_yN_z$ (x=1 to 4, y=1 to 4, z=1 to 5) (M=Group IV [Ti, Zr, Hf], Group V (V, Nb, Ta), Group VI (Cr,Mo,W), Group VII (Mn, Tc, Re), Group VIII (Fe, Ru, Os), Group IX (Co,Rh, Ir), Group X (Ni,Pd, Pt), Group XI(Cu,Ag,Au), and Group XII (Zn, Cd, Hg), boron, aluminum, gallium, indium, silicon and germanium, which can be scaled-up and are amenable to provide metal nitride and/or metal oxynitride thin films or coatings on substrates.

Figure 1:
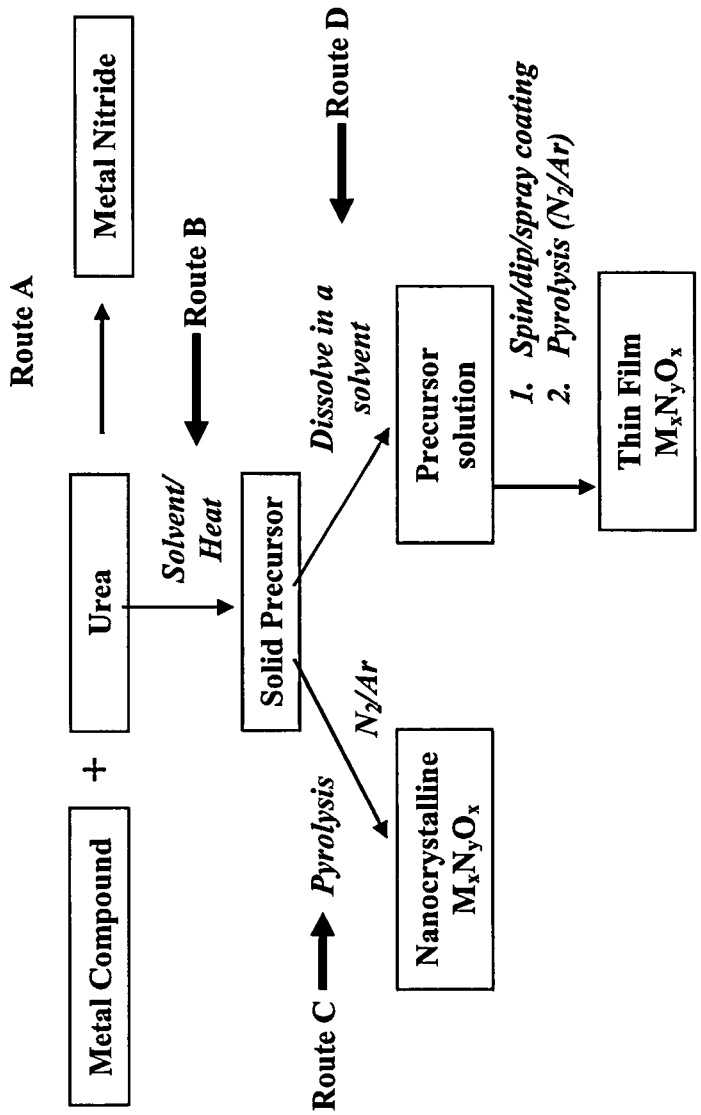
FIG. 1 is a schematic representation of metal nitride/metal oxynitride synthesis through a urea-precursor route, in accordance with a preferred embodiment of the invention.

The synthesis route for metal nitrides and metal (oxy) nitrides is schematically represented in FIG. 1. This synthesis follows a solid state route where the intermediate precursor material can be isolated, dissolved in a solvent, and used as a precursor to form metal nitride and metal (oxy)nitride thin films or coatings. The experimental results have shown that alcohol is the preferred solvent for precursor solutions, although other suitable solvents may also be used.

The versatility of the metal-urea precursor method, in accordance with an embodiment of the present invention, would allow the preparation of variety of metal nitride and/or metal oxynitride phases, by suitably modifying the reaction conditions and starting reactants. This method is exemplified in various examples, provided below.

The process can yield various products by taking three different routes, as described in the following Table 1, which includes various parameters that affect the final outcome of the process.

Route A: Direct synthesis of metal nitrides of various metal to nitrogen ratio starting from metal compound and urea.

Route B: Preparation of an intermediate metal/urea (organometallic) precursor.

Route C: Preparation of metal nitrides or metal (oxy)nitrides starting from an intermediate metal/urea precursor.

Route D: Metal nitride/Metal (oxy)nitride coatings starting from an intermediate metal/urea precursor.

TABLE 1

Various Synthesis Routes For Metal Nitrides And Metal Oxynitrides

| Parameters | Route A | Route B | Route C |
|---|---|---|---|
| Temperature (° C.) | | | |
| Preferred | 400-1000 | 30-300 | 400-1000 |
| More Preferred | 700-900 | 30-200 | 700-900 |

TABLE 1-continued

Various Synthesis Routes For Metal Nitrides And Metal Oxynitrides

| Parameters | Route A | Route B | Route C |
|---|---|---|---|
| Most Preferred | 750-850 | 30-150 | 750-850 |
| Atmosphere | Nitrogen, Argon, or both | Nitrogen, Argon, or both | Nitrogen, Argon, or both |
| Metal:Urea Ratio | | | |
| Preferred | 1:1-20 | 1:1-20 | 1:1-20 |
| More Preferred | 1:1-10 | 1:1-10 | 1:1-10 |
| Most Preferred | 1:1-6 | 1:1-6 | 1:1-3 |
| Reaction Duration | | | |
| Preferred | 2-12 h | 10 min-60 min | 2-12 h |
| More Preferred | 2-6 h | 10 min-30 min | 2-6 h |
| Most Preferred | 2 h-3 h | 10-15 min | 2 h-3 h |
| Compounds Synthesized | $M_xO_yN_z$ (x varies from 1 to 4, N varies from 1 to 5, O varies from 0 to 2) | Metal/Urea Precursor | $M_xO_yN_z$ (x varies from 1 to 4, N varies from 1 to 5, O varies from 0 to 2) |
| Particle Size | <200 nm for metal:urea ratio 1:1.5-20 >200 nm for metal:urea for 1:1-1.5 | | <200 nm for metal:urea ratio 1:1.5-20 >200 nm for metal:urea For 1:1-1.5 |

Figure 2:
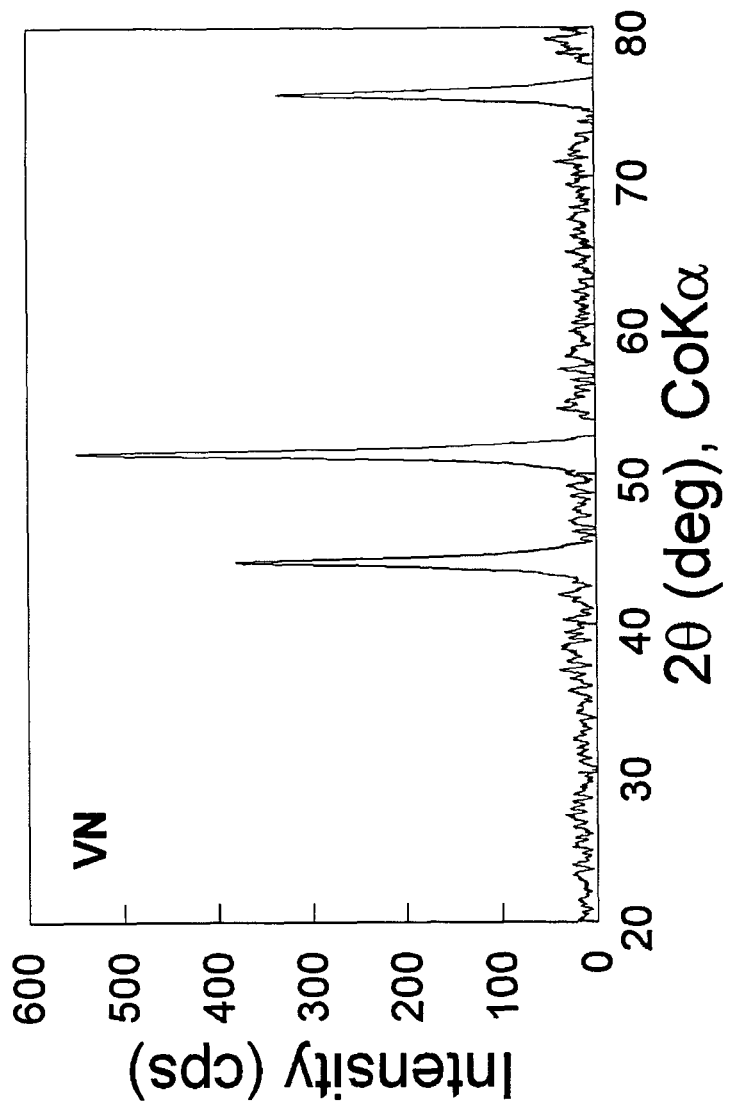
FIG. 2 is a powder X-ray diffraction pattern of nanocrystallaine vanadium nitride (VN), prepared in accordance with a preferred embodiment of the invention.
Figure 3:
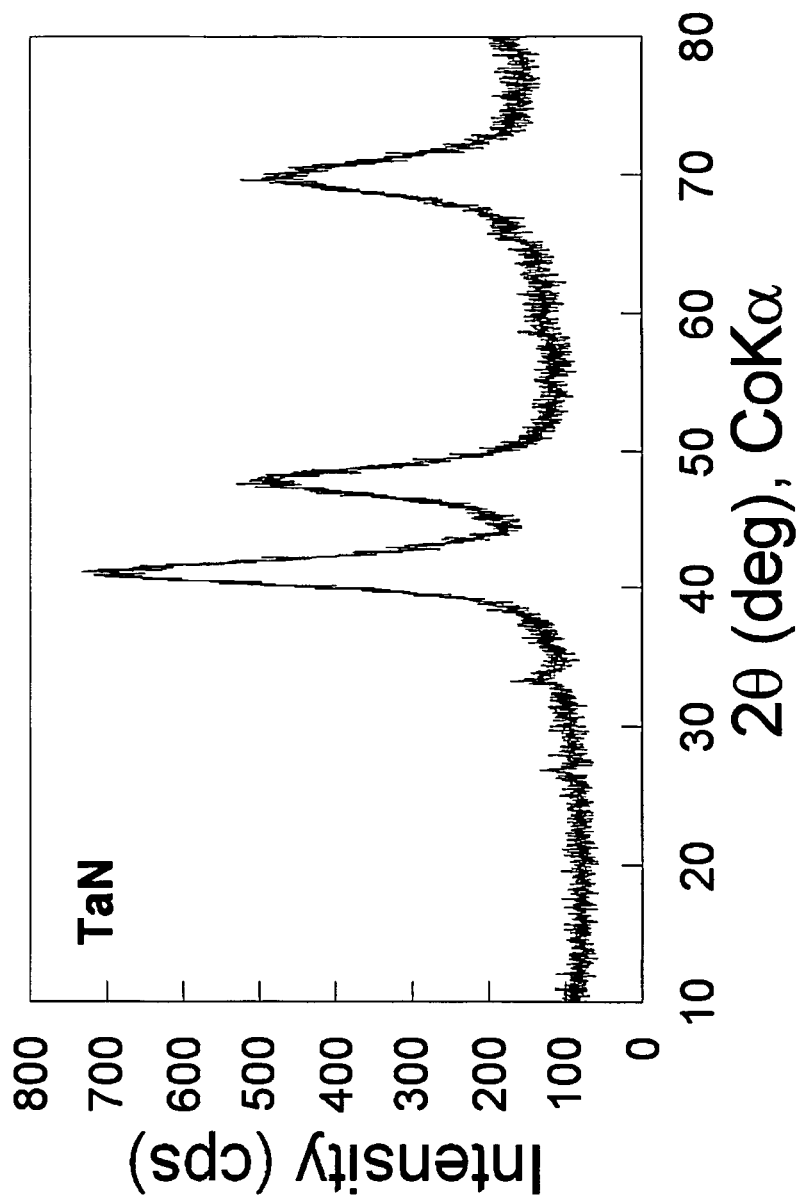
FIG. 3 is a powder X-ray diffraction pattern of nanocrystallaine Tantalum nitride (TaN), prepared in accordance with a preferred embodiment of the invention.

Metal nitrides were synthesized using ammonia generated by the in situ decomposition of urea ($NH_2CONH_2$) (Route A). This method was used to prepare NbN, VN, and TaN. In FIGS. 2 and 3, powder XRD patterns (Rigaku Miniflex) of VN and TaN, respectively, are provided.

Figure 4:
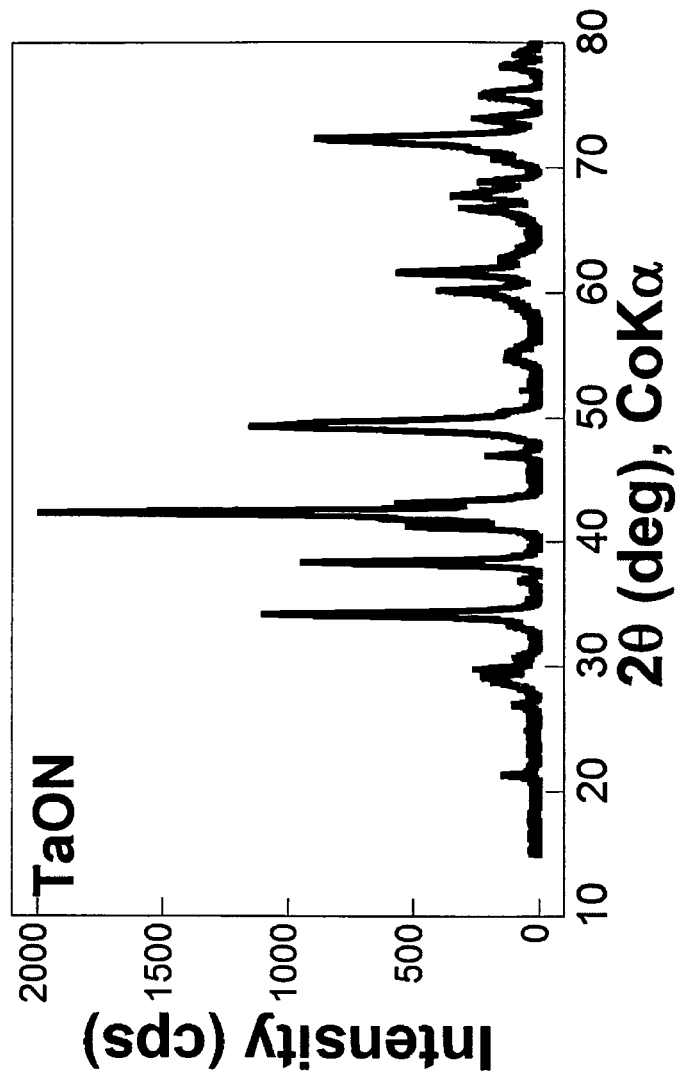
FIG. 4 is a powder X-ray diffraction pattern of nanocrystalline TaON, prepared in accordance with a preferred embodiment of the invention.
Figure 5:
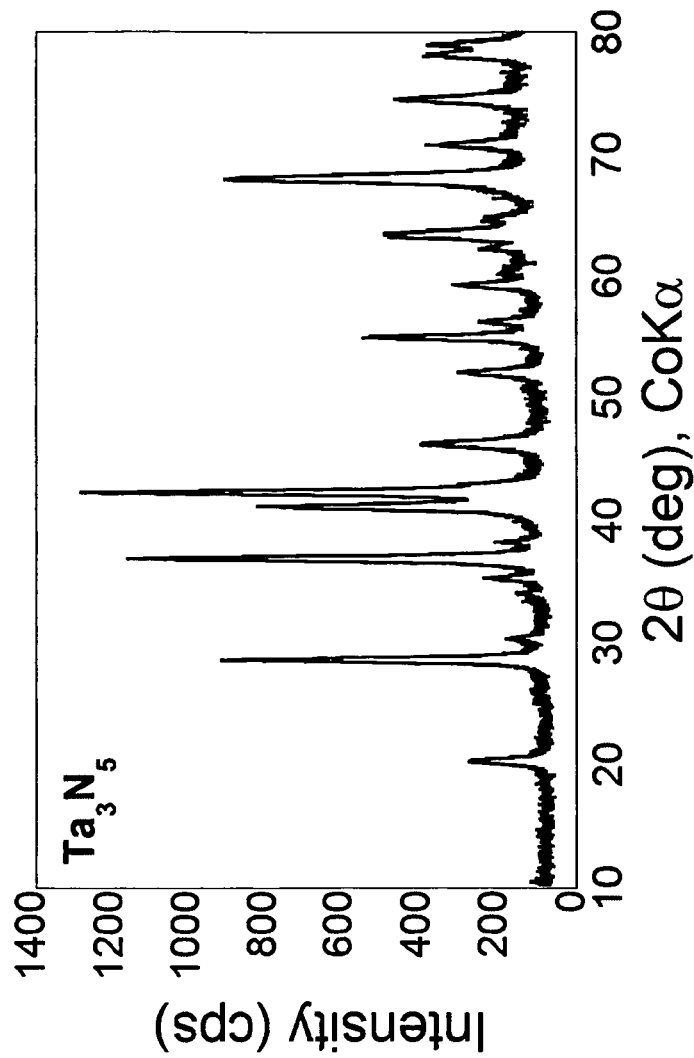
FIG. 5 is a powder X-ray diffraction pattern of nanocrystalline $Ta_3N_5$, prepared in accordance with a preferred embodiment of the invention.

Various other compositions, including metal (oxy)nitrides can be prepared by suitably modifying the reaction conditions. We discovered that varying the concentration of urea and reaction atmosphere, produced $Ta_3N_5$ and TaON (red and green colored samples, respectively). The XRD patterns of TaON and $Ta_3N_5$, are provided in FIGS. 4 and 5, respectively.

Figure 6:
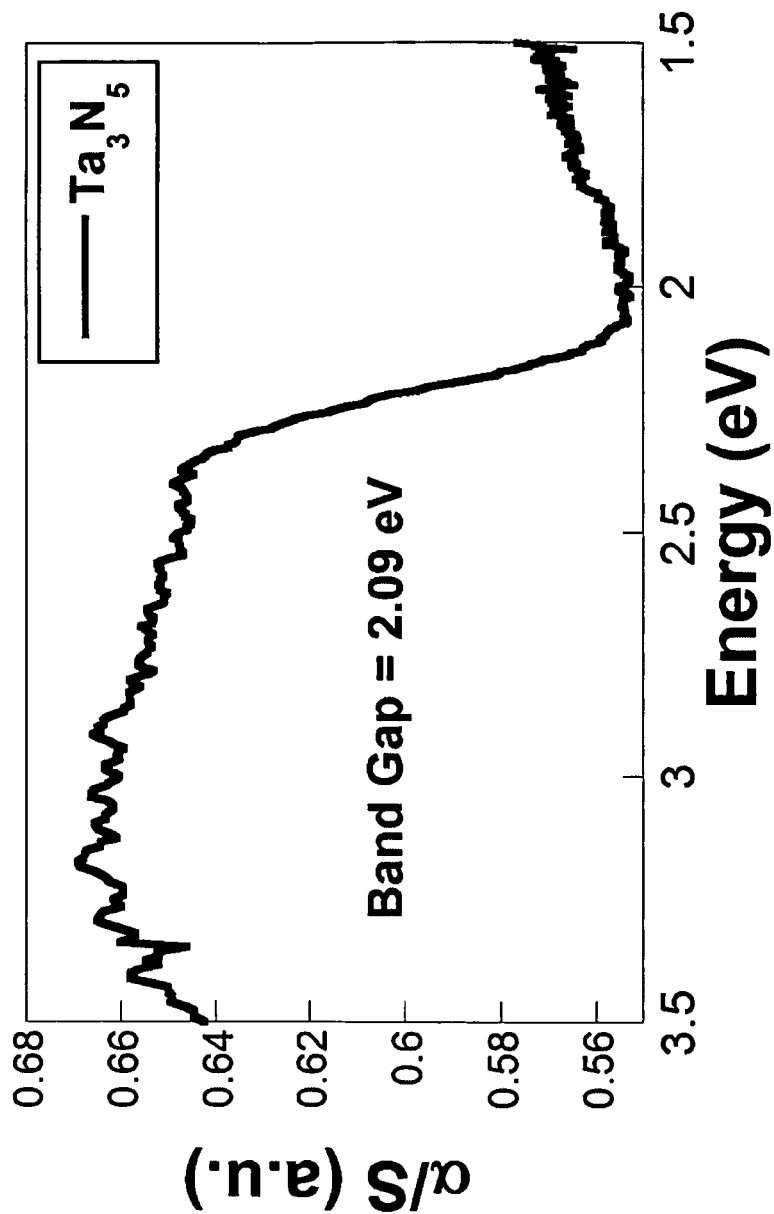
FIG. 6 is a solid state UV-vis spectrum of $Ta_3N_5$, prepared in accordance with a preferred embodiment of the invention.

The color of nanocrystalline $Ta_3N_5$ is red, while the color of cubic metal nitrides (VN, NbN and TaN) is black. The solid state UV-vis spectra of the samples were recorded in order to determine their optical band gap. Diffuse reflectance spectra were recorded on a Shimadzu UV-3101 instrument, with $BaSO_4$ as the reference sample, in the range 200-800 nm. Cubic metal nitride samples did not show any bandgap as expected from their metallic behavior. Among the above-noted metal nitride compositions, only $Ta_3N_5$ possesses the required band gap (semiconducting) for absorption of light and effectively acts as a photocatalyst in the splitting of water (FIG. 6). However, electrical and optical properties of Nb and V nitride compositions have not been studied to determine their suitability in photocatalytic splitting of water. Solid solutions with Ta, Nb and V nitrides may produce new materials with superior photocatalytic properties. The calcium-doped $Ta_3N_5$ showed a bandgap of 2.04 eV.

The BET specific surface area measurement was performed on a nitrogen adsorption apparatus (Coulter SA 3100). The BET surface area results are as follows: TaN=21.64 $m^2/g$, NbN=123.54 $m^2/g$, and $Ta_3N_5$=23.14 $m^2/g$. The values are comparable with the values reported in the literature for nanocrystalline $Ta_3N_5$ [Ref. 15]. Transmission electron microscopic image of $Ta_3N_5$ synthesized using metal/urea precursor route also confirm the nanocrystalline nature of $Ta_3N_5$ (FIG. 6). Recently, nanocrystalline metal nitrides, such as VN, have been reported as the next generation supercapacitors, which can produce a higher quality energy storage capacity for use in a variety of industrial and portable consumer electronic products.

Example 1

A mixture of $VCl_3$ and urea in the molar ratio 1:6 was heated at 900° C. for 3 h in a nitrogen atmosphere. The powder XRD pattern of the reaction product showed highly pure VN. VN nanoparticles are agglomerated and individual particles are in the 5-10 nm range.

Example 2

A mixture of $TaCl_5$ and urea in the molar ratio 1:6 was heated at 900° C. for 3 h in a nitrogen atmosphere. The powder XRD pattern of TaN materials showed broad peaks indicating the nanocrystalline nature of TaN (FIG. 3). TEM images of the material showed irregularly shaped nanocrystals in the particle size 10-25 nm.

Example 3

The precursor for TaON was prepared by reacting $TaCl_5$ and urea in the 1:1 molar ratio at 200° C. Preparation of TaON required heating the precursor in an argon atmosphere, instead of nitrogen. Green powder was obtained after annealing the precursor powder from the $TaCl_5$ and urea reaction. The powder XRD pattern (FIG. 4) confirmed the formation of TaON.

Example 4

Figure 7:
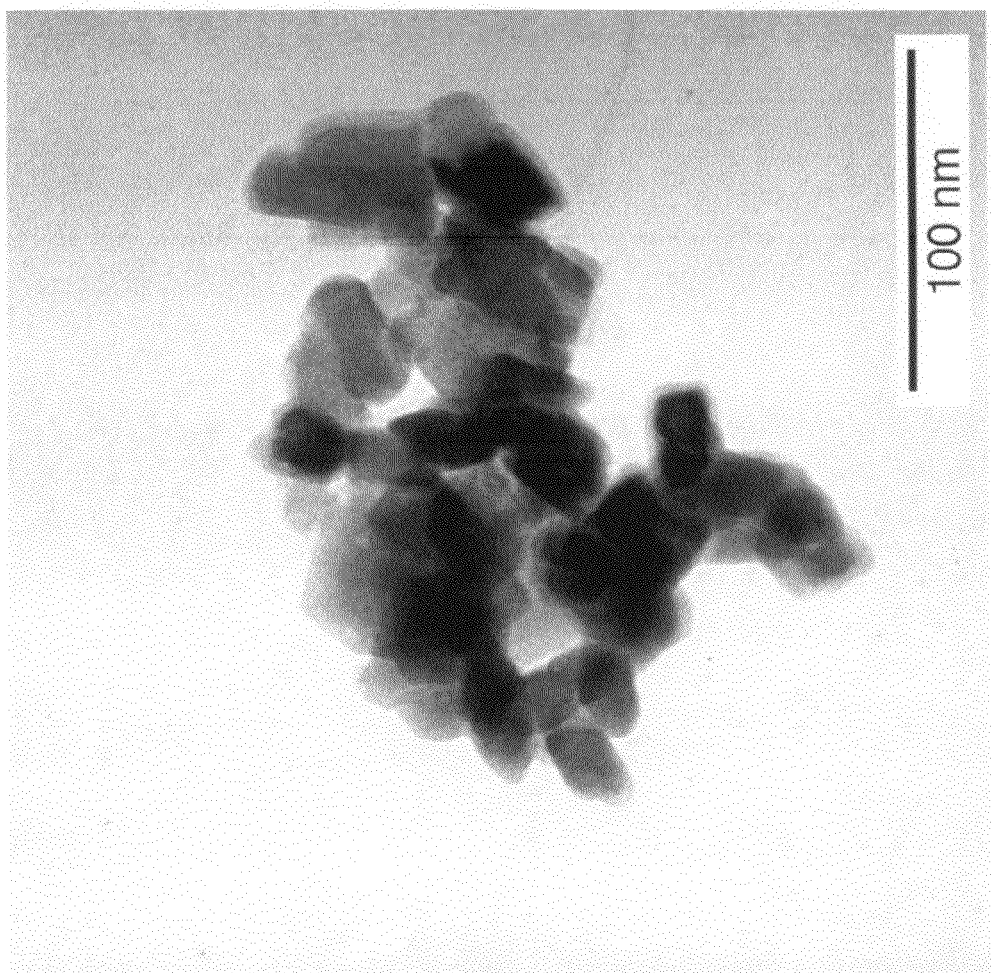
FIG. 7 is a transmission electron microscopic image of nanocrystalline $Ta_3N_5$, prepared in accordance with a preferred embodiment of the invention.

The precursor for $Ta_3N_5$ was prepared by reacting $TaCl_5$ and urea in the 1:1.5 molar ratio at 300° C. The precursor is annealed at 700° C. for 3 h to form a red colored product. The powder XRD pattern (FIG. 5) of the sample showed peaks corresponding to $Ta_3N_5$. TEM image provided in FIG. 7 support the nanocrystalline nature of $Ta_3N_5$ synthesized by the synthesis route of a preferred embodiment of the present invention.

Example 5

Metal Nitride Coatings from Metal-Urea Precursors

Metal nitride coatings are known to have a number of chemical and physical properties which make their use desirable in several technical applications. Such nitrides are generally hard, refractory materials and may be useful, for example, in such diverse applications as wear-resistant coatings for cutting tools, superconductive films, diffusion barriers and gates in integrated circuits, and in solar control panels. Further, in order to create an easily manufactured and commercialized photocatalytic electrode that will maximize the photocurrent, metal nitride coating on substrate are desirable.

A preferred embodiment of the present invention provides metal nitride and/or metal oxynitride coatings on substrates, using a solution-based coating process. $TiCl_4$ and urea were combined in a 1:1 molar ratio in an argon atmosphere. The slurry was then heated slightly above the decomposition point of urea (132.7° C.) for four hours. The TiN precursor was dissolved, using slight heat, in ethanol at 2 mg/mL concentrations. Other non-limiting examples of solvents to prepare the coating solution, include acetonitrile, ethanol, ethylene diamine, and formamide.

The metal substrates were cleaned and dip-coated in the TiN precursor solutions and dried again with the heat gun. The coated slides were heated under nitrogen at 450° C. for 3 hours. Similar coatings were provided with other metal nitride precursors including, but not limited to, tantalum, hafnium, niobium, gallium, indium and vanadium.

Example 6

Photocatalytic is Degradation of Methylene Blue (MB) Over $Ta_3N_5$ Nanoparticles The degradation of methylene blue, ($C_{16}H_{18}N_3SCl.3H_2O$), was tested as a model reaction to evaluate the photocatalytic activity of the $Ta_3N_5$ powders. The photocatalytic experiments were carried out by adding 1 mg of tantalum nitride into a solution containing 1 drop of methylene blue and 60 mL of DI water. One beaker containing the methylene blue solution and tantalum nitride, and one beaker containing only the methylene blue solution, were placed in front of a halogen lamp (~400-700 nm) for 30 minutes. The third solution remained in complete darkness 30 minutes. The solution containing the $Ta_3N_5$ that was exposed to visible radiation became colorless, while the other two remained blue in color. This clearly demonstrated the photocatalytic activity of $Ta_3N_5$ nanocrystalline powders.

Example 7

Photoelectrochemical Overall Splitting of Water

A photoelectrochemical cell is used to split water into hydrogen gas and oxygen gas. The working electrode is coated with a semiconductor catalyst. Photons hit the catalyst and excite electrons to a higher energy state. Once enough electrons have been excited they begin to revert back to their original energy level, thus releasing energy and splitting water. Hydrogen gas will collect around counter electrode and oxygen gas will collect around the working electrode.

The minimum energy required to split water is 1.23 eV. Estimates of energy lost are greater than or equal to 0.8 eV. This brings the energy required to 2.03 eV. Therefore, for a cell to split water using light alone, the reaction between photons and the working electrode must create 2.03 eV of energy (the ideal situation). If the working electrode is not creating 2.03 eV, extra energy must be applied from an outside source. The efficiency of a cell is a computed using the following equation:

$$\text{Efficiency} = J_p(V_{ws} - V_b)/Es$$

where $J_p$ is the photoelectric current, $V_{ws}$ is 1.23 eV (the amount of energy needed to split water), $V_b$ is the voltage that must be applied to the cell so that 2.03 eV is produced between the working electrode and the counter electrode, and Es is the irradiance measured outside the cell.

The amount of energy that the semiconductor is able to produce will depend on various factors. The largest being the band gap wavelength of the material. The amount of energy emitted increases with increasing band gaps. However, the maximum band gap obtainable in a material without it readily decomposing under light, or in water is 610 nanometers. Therefore, it is assumed that a material with a band gap of 610 nanometers would be the most efficient material to be used in a photoelectrochemical cell. It would create the most energy, thus limiting the amount of outside voltage that must be applied ($V_b$), thus increasing the efficiency. The photocatalytic characterization of $Ta_3N_5$ and Ca-doped $Ta_3N_5$ using a typical photoelectrochemical cell.

The powder-coated electrodes were prepared on conductive indium tin oxide (ITO) coated glass using a doctor-blade technique. The cleaned ITO glass was covered on two parallel edges with adhesive tapes to control the thickness of the films and to provide a non-coated area for electrical contact. The metal nitride powder was mixed with a polyvinyl alcohol, ethylene glycol and alcohol mixture, and then applied to the center section of ITO and uniformly spread with a glass rod. The sample electrode was then annealed at 300° C. under inert atmosphere to remove the binders. A copper wire was attached to the ITO using silver epoxy, and the metallic contact was then covered with insulating epoxy resin to isolate it from the electrolyte solution.

The photoelectrochemical cell consists of a working electrode (W), a platinum counter-electrode (C), and a saturated calomel reference electrode (SCE). The electrodes were immersed in 1M KOH solution and potentiostatic control was maintained with a Pine Instruments AFRDE5 Bi-potentiostat. 150 W halogen lamp with an infrared filter and fitted with an optical fiber gooseneck illuminator was used as the visible radiation source. The photocurrent produced in the external circuit was measured to evaluate the photocatalyst material.

Figure 8:
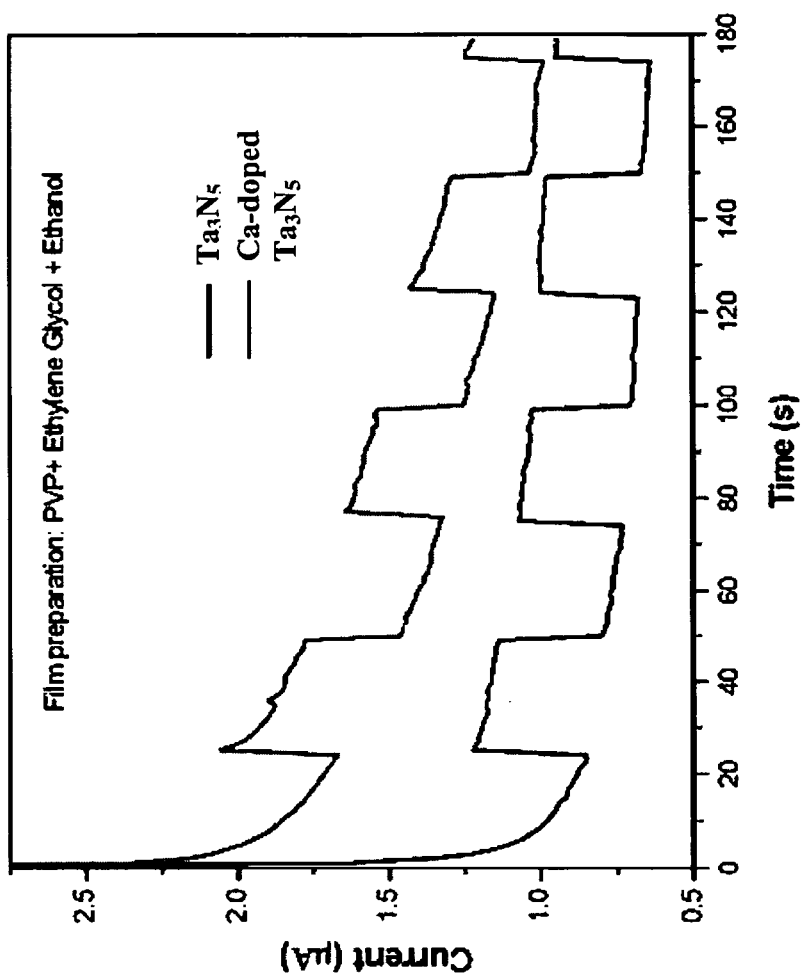
FIG. 8 is a visible light-activated photocurrent generated by $Ta_3N_5$ and Ca-doped $Ta_3N_5$, without any external bias voltage, prepared in accordance with a preferred embodiment of the invention.

A plot of photocurrent generated as a function of time with zero applied bias voltage is provided in FIG. 8. Ca-doped $Ta_3N_5$ shows a marginal increase in photocurrent as compared to pristine-$Ta_3N_5$.

Example 8

While it is known that $TiO_2$ nanoparticles, including nanotubes, exhibit catalytic properties in the presence of UV radiation, there is also a need for them to perform in ambient lighting conditions. Nitrogen doped $TiO_2$ nanoparticles including nanotubes can be prepared using the disclosed metal/urea precursor method, in accordance with an embodiment of the invention.

Figure 9:
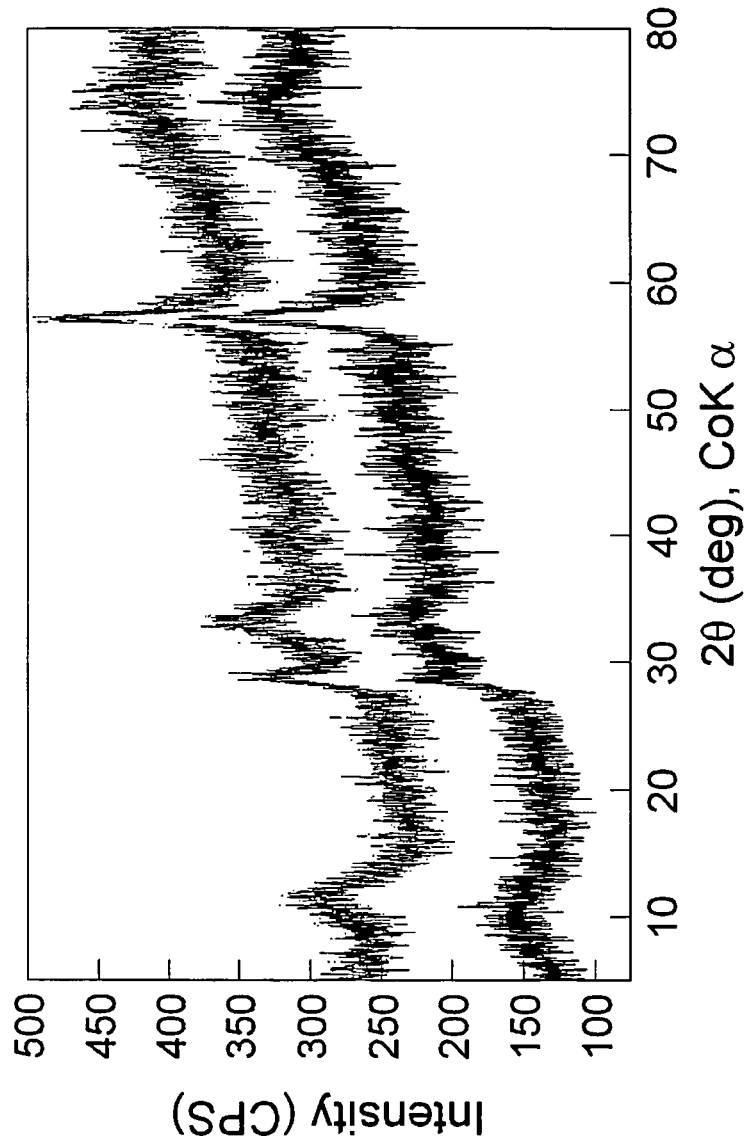
FIG. 9 is a powder X-ray diffraction pattern of $TiO_2$ nanotubes and nitrogen-doped $TiO_2$ nanotubes, prepared in accordance with a preferred embodiment of the invention.

A stoichiometric mixture of titanium dioxide nanotube powder and urea in the ratio 1:3 was heated at 300 C for 3 h under nitrogen atmosphere. Powder XRD pattern of the yellow colored compound formed (FIG. 9) showed that the structure of the $TiO_2$ nanotubes has not changed significantly. Nitrogen doped $TiO_2$ nanotubes can be used in the decontamination of chemical war fare agents, toxic industrial chemicals and toxic industrial materials.

While this invention has been described as having preferred sequences, ranges, steps, materials, structures, components, features, and/or designs, it is understood that it is capable of further modifications, uses, and/or adaptations of the invention following in general the principle of the invention and including such departures from the present disclosure as those come within the known or customary practice in the art to which the invention pertains, and as may be applied to the central features hereinbefore set forth, and fall within the scope of the invention and of the limits of the appended claims.

REFERENCES

The following references, and any cited in the disclosure herein, are hereby incorporated herein in their entirety by reference.

1a. R. Sanjines, M. Benkahoul, M. Papagno, F. Levy, D. Music, J. Appl. Phys. 2006, 99, 044911.
1b. Gmelins Handbuch der anorganischen Chemie, Niob, Teil B1, Vol. 8 (Eds.: R. J. Meyer), Verlag Chemie, Weinheim, 1970, 91-127.
1c. G. M. Demyashev, V. R. Tregulov, R. K. Chuzhko, J. Cryst. Growth 1983, 63, 135.
1d. G. M. Demyashev, V. R. Tregulov, A. A. Gavrich, J. Cryst. Growth 1988, 87, 33.
2. G.-I. Oya, Y. Onodera, *J. Appl. Phys.* 1974, 45, 1389.
3a. A. Ishikawa, T. Takata, J. N. Kondo, M. Hara, K. Domen, *J. Phys. Chem. B* 2004, 108, 11049.
3b. H.-J. Cho, D.-G. Park, I.-S. Yeo, J.-S. Roh, S. W. Park, *Jpn. J. Appl. Phys.* 2001, 40, 2814.
3c. H.-T. Chiu, C.-N. Wang, S.-H. Chuang, Chem. *Vap. Deposition* 2000, 6, 223.
3d. C.-A. Jong, T. S. Chin, *Mat. Chem. Phys.* 2002, 74, 201.
4. K. J. Lee, S. H. Yang, US Pat. Appl. Pub. No. 2001/0005612.
5. X. Z. Chen, J. L. Dye, H. A. Eick, S. H. Elder, K.-L. Tsai, Synthesis of Transition-Metal Nitrides from Nanoscale Metal Particles Prepared by Homogeneous Reduction of Metal Halides with an Alkalide, Chem. Mater. 9, 1172-1176 (1997).
6a. X. Feng, Y.-J. Bai, B. Lo, C. G. Wang, Y.-X. Qi, Y.-X. Liu, G.-L. Geng, Low Temperature Induced Synthesis of TiN Nanocrystals, *Inorg. Chem.* 43, 3558, (2004).
6b. C. J. Carmalt, A. H. Cowley, R. D. Culp, R. A. Jones, Y.-M. Sun, B. Fitts, S. Whaley, H. W. Roesky, Monomeric Titanium(IV) Azides as a New Route to Titanium Nitride, *Inorg. Chem.* 36, 3108 (1997).
6c. P. Cai, Z. Yang, C. Wang, P. Xia, Y. Qian, Synthesis of nanocrystalline VN via thermal liquid-solid reaction, *Materials Letters* 60, 410-413 (2006).
R. A. Janes, M. Aldissi, R. B. Kaner, Chem. Mater., 15, 4431 (2003).
8. A. Gomathi, C. N. R. Rao, Nanostructures of the binary nitrides, BN, TiN, and NbN, prepared by the urea-route, Materials Research Bulletin, 41, 941-947 (2006).
9. L. E. Toth, Transition Metal Carbides and Nitrides, Academic Press, New York, 1971.
10. P. K. Tripathy, J. C. Sehra, A. V. Kulkarni, J. Mater. Chem. 11, 691 (2001).
11. I. P. Parkin, Chem. Soc. Rev., 25, 199 (1996).
12. L. Chen, Y. Gu, L. Shi, Z. Yang, J. Ma, Y. Qian, Solid State Communications, 132, 343-346 (2004).
13. R. Fix, R. G. Gordon, D. M. Hoffman, Chem. Mater., 5, 614-619 (1993).
14. A. Newport, C. J. Carmalt, I. P. Parkin, S. A. O'Neill, J. Mater. Chem. 12 1906, (2002).
15. Qinghong Zhang and Lian Gao, Ta3N5 Nanoparticles with Enhanced Photocatalytic Efficiency under Visible Light Irradiation, Langmuir, 20, 9821-9827 (2004).
16. JCPDS Card No. 38-1155, Joint Committee on Powder Diffraction Standards Data Base, International Center for Diffraction Data, Swarthmore, Pa., 1992.

What is claimed is:

1. A method of providing a substrate with a metal nitride or metal oxynitride coating, comprising the steps of:
   a) providing a suitable amount of an organometallic precursor prepared from a stoichiometric mixture of a metal compound and urea in a ratio of 1:1.5;
   b) forming a solution of the organometallic precursor using a solvent;
   c) coating the substrate with the solution prepared in step b); and
   d) heating the coated substrate to 400-1000° C. in the presence of nitrogen, argon or both; and
   e) wherein the coating comprises tantalum nitride ($Ta_3N_5$).

* * * * *